Aug. 20, 1957     H. C. MARSTON     2,803,160
SIGHTING DEVICE

Filed Aug. 9, 1954     2 Sheets-Sheet 1

HUBERT C. MARSTON
INVENTOR

HUEBNER, BEEHLER,
WORREL & HERZIG
ATTORNEYS

BY Richard M. Worrel

Aug. 20, 1957     H. C. MARSTON     2,803,160
SIGHTING DEVICE

Filed Aug. 9, 1954     2 Sheets-Sheet 2

HUBERT C. MARSTON
INVENTOR

HUEBNER, BEEHLER,
WORREL & HERZIG
ATTORNEYS

# United States Patent Office 2,803,160
Patented Aug. 20, 1957

2,803,160
SIGHTING DEVICE

Hubert C. Marston, Fresno, Calif.

Application August 9, 1954, Serial No. 448,532

5 Claims. (Cl. 88—2.7)

The present invention relates to optical instruments and more particularly to a sighting apparatus for determining the position of a line having predetermined relation to a line of reference which is especially adapted to the plotting of traffic guide lines and the like in predetermined relation to roadway edges, right-of-way fences, curbs or other reference media.

It is presently conventional practice to divide highways, roads and the like into numerous traffic lanes for proper channeling of traffic. Such lines generally are indicated by narrow white, or otherwise colored, lines applied longitudinally of the highway between the side edges thereof. In the past, certain time consuming preliminary operations have been necessary by highway crews or workmen in order to prepare the highway for the subsequent application of the dividing lines. It has been necessary to measure inwardly from the edges of the road a certain distance in order accurately to determine the line along which the stripe should be applied. Guide markers, sometimes in the form of small pieces of cloth, were then tacked or otherwise secured to the highway along such a measured line in order to aid the operator in steering the striping apparatus down the highway. The expense in time and labor as well as the limited accuracy of such a system is believed obvious.

Rather complex mechanical arrangements have been devised to aid in applying highway stripes more accurately and without such preliminary operations as above noted. One of these employs cords which are held by workmen walking along the edges of the road adjacent to the apparatus. These cords operate an indicator visible to the driver of the apparatus who can determine thereby whether he is properly steering the mechanism along the road. Such arrangements are advantageous but somewhat difficult to operate with sufficient accuracy and still require an additional highway crew besides the driver of the apparatus. Such problems as these demonstrate a need in highway striping mechanisms for a convenient and relatively accurate mechanism for indicating to the driver of the apparatus the proper path along which to steer the vehicle.

Accordingly, it is an object of this invention to provide improvements in devices for accurately and efficiently locating lines having predetermined relation to reference points or lines and more particularly for more accurately and speedily directing roadway marking apparatus.

Another object is to eliminate preliminary measuring operations prior to the application of dividing lines on highways.

Another object is to provide an arrangement for accurately guiding a highway striping apparatus along a predetermined line on which a dividing stripe is to be applied simultaneously with the application of such a dividing stripe.

Another object is to provide an optical system for determining accurately the position of a vehicle relative to two fixed laterally spaced boundary lines.

Another object is to provide an optical system in a highway striping apparatus adapted accurately to guide the steering of the apparatus between selected lateral distances from the edges of the highway.

Another object is to provide a sighting device in a highway striping apparatus for viewing the edges of the highway which is adjustable to accommodate a variety of road widths.

Another object is to provide an optical system in a highway striping apparatus viewable by the operator of the apparatus to sight the edges of the road and visually to relate such sighted edges to a line simulating the line along which it is desired to apply a highway dividing stripe.

Another object is to provide a sighting device as set forth in the preceding paragraphs which is simple in construction, adaptable to conventional highway striping mechanisms, economical to build and which is accurate and efficient for the purposes intended.

These and other objects will become more fully apparent upon reference to the following description.

Figure 1:
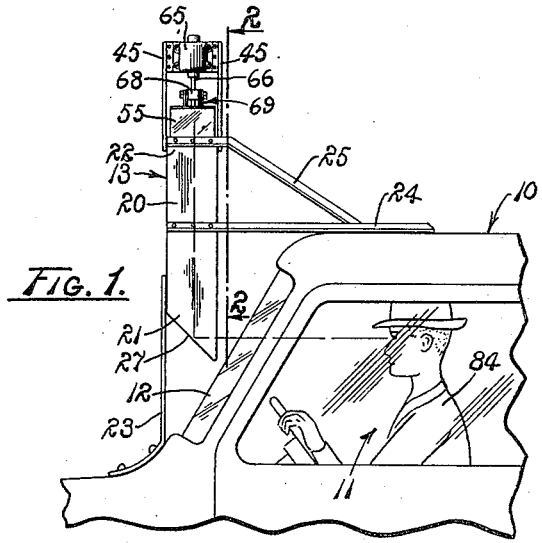
Figure 1 is an elevational view showing a fragmentary portion of a vehicle, such as truck suitable for carrying or drawing a highway striping apparatus, having the sighting attachment of the present invention mounted thereon.

Referring more particularly to the drawings:

In Figure 1, the cab of a highway striping or marking apparatus, such as that shown in Patent No. 2,221,908, or of a truck for pulling or otherwise conveying a marking apparatus, is shown at 10. The details of the striping apparatus form no specific part of the invention and therefore have not been shown. Many and various forms of such apparatus are well known and as the description proceeds, it will be readily apparent that the sighting device of the present invention lends itself to use on a variety of such apparatus. The vehicle 10 provides an operator's station or driver's seat 11 and a windshield 12. The sighting attachment of the present invention is generally indicated at 13.

The sighting attachment 13 in general simulates a periscope construction and includes an elongated hollow housing 20 having a lower end 21, and an upper end 22. It is mounted in substantially upright position on the vehicle 10. For supporting the housing in such a position a brace 23 attached to the vehicle forwardly of the windshield 12 is connected adjacent to the lower end of the housing. A pair of substantially horizontal braces 24 are attached to the vehicle above the operator's station 11 and extend forwardly for connection to the sides of the housing. Further, for additionally supporting the housing, an inclined brace 25 is connected adjacent to the braces 24 and also to the upper end of the housing. It will be readily apparent that any other convenient supporting arrangement can be provided, as desired. The housing provides at its upper end an upwardly disposed opening 26. At its lower end, the housing provides a downwardly inclined end wall 27 and a lateral opening 28 facing the windshield 12 of the vehicle.

Figure 2:
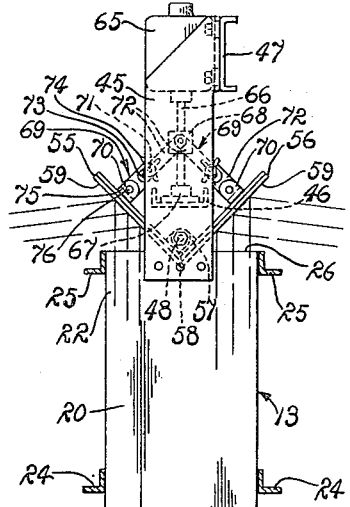
Figure 2 is a somewhat enlarged rear elevation of the sighting attachment taken along lines indicated at 2—2 in Figure 1.
Figure 3:
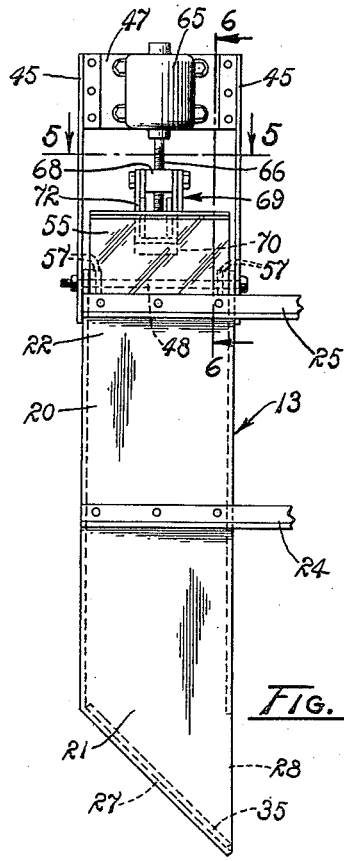
Figure 3 is a side elevation of the sighting attachment, as shown in Figure 2.
Figure 4:
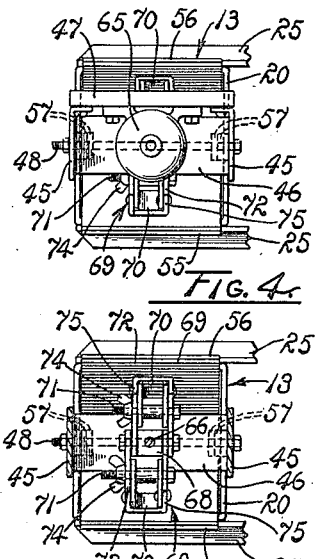
Figure 4 is a fragmentary top plan view of the sighting attachment shown in Figures 2 and 3.
Figure 5:
Figure 5 is a horizontal section taken on lines 5—5 in Figure 3.

A plan position glass mirror 35, or some other suitable material having a highly polished reflecting surface, is mounted on the end wall 27 and thus assumes a downwardly inclined position relative to the housing. The plan position mirror provides a cross hair or reticle line 36 inscribed thereon centrally of the mirror. In Figure 2, it will be noted that this line lies in a vertical plane substantially aligned with the forward direction of movement of the vehicle 10. For descriptive convenience and reference hereinafter, the cross hair 36 divides the plan position mirror into a left side 37 and a right side 38, as seen in Figure 2.

A pair of brackets 45 are mounted in upwardly extended spaced relation on the upper end 23 of housing 20. A substantially horizontal channel member 46 is connected between the brackets adjacent to the upper end of the housing and a vertical channel 47 is connected between the brackets at their upper extremities. A pivot pin 48 is also mounted between the brackets below the horizontal channel and is disposed in a substantially horizontal position likewise lying in a vertical plane aligned with the cross hair 36 and thus, the predetermined direction of travel of vehicle 10.

Figure 6:
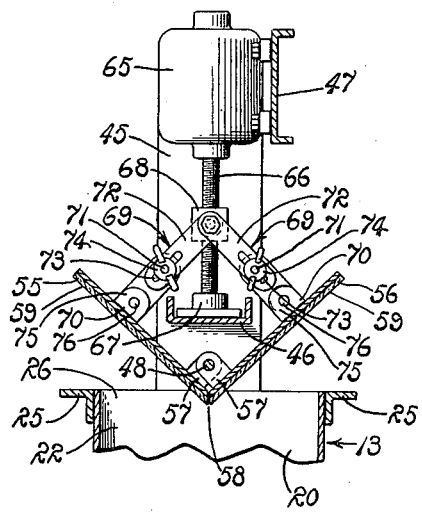
Figure 6 is a somewhat enlarged fragmentary rear elevation of the sighting attachment showing portions thereof in section.

A left and a right sighting mirror, 55 and 56, is each provided with a pair of spaced lugs, as 57—57, adjacent to the lower edge thereof and is thereby journalled for pivotal movement on the pivot pin 48. As best seen in Figure 6, the lower edges 58 of these mirrors are oppositely inwardly sloped for mating abutment. The mirrors are maintained in upwardly divergent inclined acute angular relation when the edges are in abutting engagement, as shown in Figure 6. Each of the mirrors is provided with a reflecting surface, as at 59, which is upwardly outwardly extended from the pivot pin so as to face laterally and downwardly relative to the vehicle 10. The left sighting mirror 55 is adapted to transmit light reflected from the left side of vehicle 10 downwardly through the housing to the left side 37 of the plan position mirror. A similar but oppositely directed view is achieved by the right sighting mirror 56 and right side 38 of the plan position mirror.

An electric stepped progression motor 65 is mounted on the vertical channel 47 in an axially erect position and is provided with a threaded shaft 66 extended downwardly toward the horizontal channel 46. A journal block 67 is mounted on the horizontal channel for rotatably receiving the end of the threaded shaft 66. A threaded block 68 is threadably mounted on shaft 66 and, as will be quite apparent, is adapted for elevational movement upon rotation of the shaft 66 when the motor 65 is energized.

A pair of longitudinally adjustable arms 69 are provided for connecting each of the sighting mirrors 55 and 56 to the threaded block 68. Each arm includes a U-shaped strap 70 having a base connected back of the mirror, in a manner soon to be described, and provides a pair of bifurcated ends upwardly extended. Each arm further includes a pair of links 71 pivotally connected on opposite sides of the block 68 and having slotted ends 72 individually adjacent to the upwardly extended bifurcated ends of the strap. The bifurcated ends are provided with openings aligned with the slots and a bolt 73 extends through the openings and slots. A wing nut 74 is threadably attached to the bolt for tightening the links 71 securely to the U-shaped strap 70 and thus permits longitudinal adjustment of the arm associated therewith and dependable retention in adjusted telescopic relation. It will be apparent that other telescopically adjustable members can be substituted for the arms described. So that the arms may pivot on the mirrors upon actuation of the motor, ears 75 are rigidly mounted on the mirrors in equally spaced relation to the pivot pin 48 and the arms pivotally coupled thereby by pins 76.

*Operation*

The operation of this invention, as described, is believed to be readily apparent and is briefly summarized at this point. The sighting attachment is adapted for mounting on a striping apparatus, represented by the vehicle 10, by brackets 23, 24 and 25. Assuming that traffic lane stripes are to be applied to a highway, the vehicle is driven onto the highway and maneuvered into a longitudinal position centrally of the side edges thereof with the painting apparatus adjusted to apply a stripe in a desired position on the highway. The sighting attachment of this invention is then ready for initial adjustment.

It is first assumed that it is desired to apply a stripe down the exact center of the highway. Accordingly, the wing nuts 74 are loosened and the arms 69 adjusted to equal lengths. The plan position mirror 35 is then observed to see if the side edges of the highway are in view. For this purpose the reflection of the left and right hand sides of the road, indicated at 82 and 83 in Figure 2, should lie on opposite sides of cross-hair 36, which is representative of the line along which the stripe is to be applied. The length of arms 69 may be varied, raising or lowering the mirrors 55, 56 to move the side edge reflections closer to or farther from the cross-hair, as is considered most convenient to the observer. Irrespective of their actual position on the left and right side of the plan position mirror, it is to be understood that the side edge reflections are to be positioned initially at equal distances from the cross-hair. If the road is so wide that the side edges thereof cannot be brought within proper reflecting angle to the sighting mirrors, even in their uppermost positions, the motor 65 is energized and the block 68 run up the shaft 66 until the edges are brought in view. Thus by manipulation of the wing nuts 74 and block 68 through the motor, the side edges of the road are brought within convenient viewing position on each side of line 36, such as shown in Figure 2 at 82.

The vehicle is then driven down the highway in a normal manner and the striping apparatus operated to apply a stripe. The operator of the vehicle, indicated at 84, watches the plan position mirror from the operator's seat, and can thus determine at all times the position of the vehicle relative to the edges of the road. If the vehicle veers to the right, the line 84 on the right side of the plan position mirror will move toward the center line 36 and line 83 will move farther away. This indicates to the driver that the vehicle must be steered slightly to the left. In this manner the operator can steer the vehicle along a true course by keeping the centerline exactly centered between the edge reflection lines. The steering apparatus will therefore continuously apply a stripe along a line centered exactly between the side edges of the highway.

Although the above adjustment and operation has proved succesful, another adjustment may be preferable to some operators. In this case, the side edge reflections 82 and 83 are brought into overlying coincident relation with the cross-hair 36. This is indicated by the dotted line 85 in Figure 2, such line being minutely spaced from cross-hair 36 for illustrative purposes, it being understood that in the actual adjustment, such dotted line would represent lines 82 and 83, overlaid with line 36. With such an adjustment, the operator need only maintain the single line 85 coincident with line 36 for proper stripe application.

On highways adapted to provide three or more lanes, it is necessary to apply some of the dividing lines at positions unequally spaced from the edges. In such instances, a different initial adjustment of the apparatus is required. Assuming that it is desired to position a marker strip closer to the left edge of the road than to the right edge, the following adjustment is performed. The wing nuts 74 are loosened and the left sighting mirror 55 adjusted until the left edge of the road is brought into viewing relation on the left side of the plan position mirror 35. Since the right side of the road is now further displaced from the vehicle than the left side, it is necessary to incline the right sighting mirror 56 in a position closer to a vertical plane passing through the pivot pin 48 than the sighting mirror 55. Although the sighting mirrors are positioned initially at different angles relative to a vertical plane, the reflection on the plan position mirror 35 is as before, namely, equally spaced on opposite sides of cross-hair 36 simulating again the stripe line. When this is done the wing nuts are tightened in place. As before, it may be necessary to adjust the block elevationally to accommodate various road widths. The operator drives the vehicle down the road maintaining the vehicle on the desired course by viewing the plan position mirror and keeping the edges 82 of the road at equal distances from the cross-hair 36.

Again the adjustment may comprise aligning the reflection lines in coincident relation with cross-hair 36, as will be evident. It will be apparent that the angular position of sighting mirrors 55 and 56 may be changed relative to a vertical plane through pin 48 by the wing nuts 74 to correspond to the placement of a marker strip at any longitudinal position between the edges of the road. In any case, as above explained, the motor 65 may be energized to raise or lower the sighting mirrors 55 and 56 around the pivot pin 48 in order to bring the edges of the road into viewing relation on the plan position mirror depending upon the width of the road.

Figure 7:
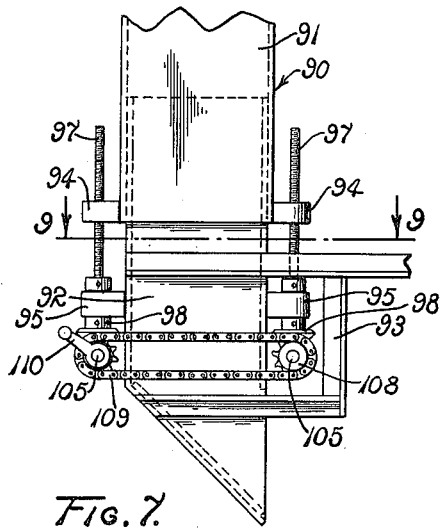
Figure 7 is a fragmentary side elevation of a sighting attachment similar to that shown in Figures 1 to 6 but providing a modified form of housing therefor.
Figure 8:
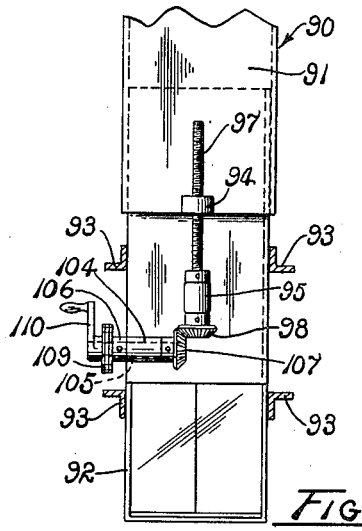
Figure 8 is a fragmentary side elevation of the device shown in Figure 7.
Figure 9:
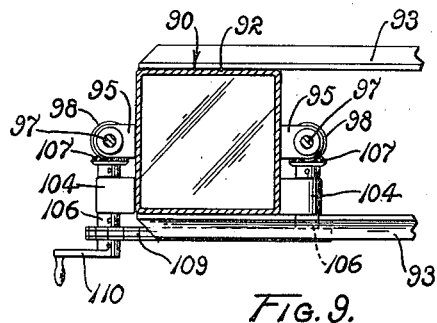
Figure 9 is a horizontal section taken on lines 9—9 of Figure 7.

A second form of housing 90 is shown in Figures 7 to 9. This housing provides upper and lower telescopic portions 91 and 92. The housing is supported on the vehicle 10 in much the same manner as housing 20 but due to various mechanisms associated therewith requires the use of a pair of substantially right angular braces 93 connected between the side of lower portion 92 and braces 24 in lieu of the braces 23 and 25.

The upper portion 91 of the housing is provided on opposite lateral sides thereof with a pair of laterally extending ears 94 having vertically disposed threaded bores. The corresponding side of the lower portion 92 of the housing is also provided with a pair of ears 95 having bores axially aligned with the threaded bores in ears 94. Threaded rods 96 are rotatably journalled individually in the bores of the lower ears and are upwardly extended being threadably received in the threaded bores of the upper ears. Stop collars 97 are provided on the rods on each side of the lower ears thereby permitting rotational but precluding longitudinal movement of the rods. Each of the threaded rods 96 is provided with a bevelled gear 98 on the lower end thereof.

The lower portion 92 of housing 90 is provided on the forward and rearward side thereof with another set of journal blocks 104, best seen in Figure 9, having horizontally disposed bores through which are rotatably extended control shafts 105. Stop collars 106 again permit only rotational movement of the shafts. A bevelled gear 107 is mounted at one end of each control shaft for intermeshing engagement with the adjacent bevel gear 98. A sprocket 108 is mounted on the other end of each control shaft and a chain 109 extends around the sprockets permitting driving connection therebetween. A control rod handle 111 is connected to one of the control shafts and upon rotation thereof enables rotation of the threaded rods 97 to permit extension and contraction of the upper and lower portions 91 and 92 of housing 90.

The telescopic housing 90 may be substituted for housing 20 in the apparatus as shown from Figures 1 to 6 for providing additional height to the sighting apparatus. It will be readily apparent that by extending the housing the sighting mirrors 55 and 56 are elevated to enable the bringing of road edges displaced substantial lateral distances from the vehicle 10 into viewing position on the plan position mirror 35. This arrangement serves somewhat the same purpose as the motor 65, threaded shaft 66, and arms 69 but in certain applications is necessary to provide the additional height obtained thereby. Alternatively, the motor 65 and threaded shaft 66 can be eliminated and the telescoping housing arrangement used alone.

The foregoing will suggest that only one mirror as 55 or 56 may be used for the intended purposes. In this regard, it should be remembered that although such an arrangement would be effective on highways of constant width, or in some other highway designs, two mirrors are necessary effectively to guide the apparatus down the center of highways having divergent or convergent edges or other longitudinal guide lines.

From the foregoing it will be apparent that a highly convenient sighting attachment for a road striping apparatus has been provided. It is unnecessary to make preliminary marks on the highway prior to the application of the stripes thereto. With the device of the present invention, it is only necessary to make the preliminary adjustments in the apparatus to bring the edges of the road into viewing position on the plan position mirror 35. Thereafter, the operator of the apparatus can maintain the vehicle on a predetermined course as it is driven down the highway by simply watching the plan position mirror. The attachment is readily adjustable for use on roads of various widths and for guiding the application of stripes at selected lateral distances from the edges of the road. Further, it can be conveniently mounted on any vehicle without extensive modification or alteration of existing parts.

Although the foregoing description has alluded throughout to highway striping apparatus, the invention is adaptable to other environments where it is desired to guide a vehicle along a predetermined path between two lateral boundary or guide lines.

Although the invention has herein been shown and described in what is conceived to be the most practical and preferred embodiments, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. A sighting attachment for a highway striping vehicle comprising an elongated telescopic hollow housing mounted on the vehicle having upwardly and downwardly extended open ends, means for extending and contracting the housing, spaced bracket members, mounted in upwardly extended positions from the upwardly disposed open end of the housing, a pivot pin mounted in substantially horizontal position between the bracket members and axially aligned with the direction of travel of the vehicle, a pair of flat mirrors journalled on the pivot pin adapted for movement between a position of substantially right angular relation and a position approaching substantially parallel relation and having reflecting surfaces facing laterally of said direction of travel adapted to reflect downwardly through the housing, an electric motor mounted between the bracket members having a screw-threaded shaft downwardly extended in substantial alignment with the axis of the housing, a block threadably mounted on the shaft adapted for elevational movement upon rotation of the shaft, a pair of longitudinally adjustable arms individually pivotally connected at one end to the block and rigidly connected at the other end of the mirrors for adjusting individually the angular relation between the mirrors and for controlling simultaneously the angular position of the mirrors in response to movement of the block, a viewing mirror mounted adjacent to the downwardly extended open end of the housing downwardly angulated therefrom and having a reflecting surface adapted to reflect light transmitted from the upper mirrors to a viewing position in the vehicle, and a hairline inscribed on the mirror centrally thereof and lying in a vertical plane aligned with the axis of the pivot.

2. A sighting device for guiding a vehicle centrally along a road having side edges comprising a telescopic housing open at both ends, having telescopingly connected upper and lower portions and mounted in upright position on the apparatus, a plan position mirror mounted on the lower portion of the housing in downwardly inclined position therefrom adapted to reflect light rays transmitted through the open end of the housing adjacent thereto to an operator's station in the apparatus, a substantially horizontal pivot axle mounted on the upper portion of the housing in vertical spaced relation above the plan position mirror, a pair of sighting mirrors individually journalled on the pivot axle in upwardly disposed acute angular relation having upwardly inclined reflecting surfaces facing laterally of the apparatus and adapted to reflect an image of the edge of the road toward which it is facing downwardly through the housing to the plan position mirror, means connected to each of the sighting mirrors for adjusting individually the inclination of each of the sighting mirrors upon movement around the pivot axle, control means for adjusting simultaneously the angular relation between the sighting mirrors, vertically aligned upper and lower pairs of ears laterally extended from opposite sides of the upper and lower portions of the housing respectively, each having bores therein with the upper bores being threaded, threaded rods threadably received in the upper bores and journalled in the corresponding lower bores, and drive means for rotating each of the rods simultaneously.

3. A sighting device for guiding a vehicle centrally along a road having side edges in a predetermined direction of travel comprising a telescopic housing open at both ends, having telescopingly connected upper and lower portions and mounted in upright position on the apparatus, a plan position mirror mounted on the lower portion of the housing in downwardly inclined position therefrom adapted to reflect light rays transmitted through the open end of the housing adjacent thereto to an operator's station in the apparatus and having a cross-hair representative of a predetermined path inscribed thereon lying in a vertical plane coincident with said predetermined direction of travel, a substantially horizontal pivot axle mounted on the upper portion of the housing in vertical spaced relation above the plan position mirror and lying in said vertical plane, a pair of sighting mirrors individually journalled on the pivot axle in upwardly disposed acute angular relation having upwardly inclined reflecting surfaces facing laterally of the apparatus and adapted to reflect an image of the edge of the road toward which it is facing downwardly through the housing to the plan position mirror, means connected to each of the sighting mirrors for adjusting individually the inclination of each of the sighting mirrors upon movement around the pivot axle, control means for adjusting simultaneously the angular relation between the sighting mirrors, and control means for contracting and expanding the upper and lower portions of the housing.

4. In a vehicle, a sighting attachment for guiding the vehicle along a path of travel in predetermined spaced relation between visual lines of reference on opposite sides of the vehicle comprising a plan position mirror mounted in the vehicle in a position inclined forwardly in the vehicle's normal direction of movement viewable from an operator's station in the vehicle and having a guide line thereon located along a line of intersection of a vertical plane aligned with said direction of travel and the plan position mirror, a substantially horizontal pivotal axis member mounted in the vehicle in vertically spaced relation above the plan position mirror in a vertical plane coincident with the guide line, a pair of sighting mirrors individually pivotally mounted on the axis member and upwardly and oppositely inclining therefrom facing laterally of the vehicle, a reversible motor having a rotatable screw-threaded drive shaft located in substantially right angular relation to the axis member and in said vertical plane, a control member screw-threadably mounted on the drive shaft of the motor adjacent to the pivotal mirrors, and links pivotally interconnecting the control member and each of the pivotal mirrors.

5. A device of the character set forth in claim 4 in which the links are independently telescopically adjustable.

References Cited in the file of this patent

UNITED STATES PATENTS

| | | |
|---|---|---|
| 854,310 | Robertson | May 21, 1907 |
| 1,723,863 | Jeffrey | Aug. 6, 1929 |
| 1,918,802 | Fleischer | July 18, 1933 |
| 2,334,411 | Humphrey | Nov. 16, 1943 |

FOREIGN PATENTS

| | | |
|---|---|---|
| 495,343 | France | June 27, 1919 |